United States Patent [19]

Argade

[11] Patent Number: 5,651,055
[45] Date of Patent: Jul. 22, 1997

[54] DIGITAL SECRETARY

[75] Inventor: Pramod Vasant Argade, Allentown, Pa.

[73] Assignee: Lucent Technologies Inc., Murray Hill, N.J.

[21] Appl. No.: 496,372

[22] Filed: Jun. 29, 1995

[51] Int. Cl.$^6$ ............... H04M 1/65; H04M 1/66
[52] U.S. Cl. ............... 379/88; 379/142; 379/189; 379/199
[58] Field of Search ............... 379/88, 89, 67, 379/199, 142, 189, 188

[56] References Cited

U.S. PATENT DOCUMENTS

| | | | |
|---|---|---|---|
| 4,488,005 | 12/1984 | Frantz | 379/37 X |
| 4,549,045 | 10/1985 | Castro et al. | 379/199 X |
| 4,850,005 | 7/1989 | Hashimoto | 379/51 |
| 4,998,291 | 3/1991 | Marui et al. | 379/88 X |
| 5,003,574 | 3/1991 | Deng et al. | 379/75 |
| 5,283,818 | 2/1994 | Klausner et al. | 379/67 |
| 5,394,445 | 2/1995 | Ball et al. | 379/67 |
| 5,511,111 | 4/1996 | Serbetcioglu et al. | 379/67 |

FOREIGN PATENT DOCUMENTS

| | | | |
|---|---|---|---|
| 0041060 | 3/1982 | Japan | 379/80 |
| 0207756 | 12/1983 | Japan | 379/199 |
| 0208965 | 11/1984 | Japan | 379/199 |
| 0229561 | 11/1985 | Japan | 379/199 |
| 0157053 | 7/1986 | Japan | 379/199 |
| 0132459 | 6/1987 | Japan | 379/214 |
| 0278860 | 12/1987 | Japan | 379/89 |
| 0256038 | 10/1988 | Japan | 379/188 |
| 5-136866 | 6/1993 | Japan | 379/80 |
| 2260670 | 4/1993 | United Kingdom | 379/373 |

OTHER PUBLICATIONS

AT&T Microelectronics Product Note, "AT&T Enhanced Telephone Answering Device (ETAD)–LC30 Version", Jan. 1955, pp. 1–5.

"Toward Vision 2001: Voice and Audio Processing Considerations", AT&T Technical Journal, Mar./Apr. 1995, pp. 4–13.

"Deployable Automatic Speed Recognition Systems: Advances and Challenges", AT&T Technical Journal, Mar./Apr. 1995, pp. 45–56.

"Digital Signal Processors: Toward Vision 2001", AT&T Technical Journal, Mar./Apr. 1995, pp. 71–80.

"Talking to Machines Today and Tomorrow; Designing for the User", AT&T Technical Journal, Mar./Apr. 1995, pp. 81–91.

Primary Examiner—Thomas W. Brown
Attorney, Agent, or Firm—James H. Fox

[57] ABSTRACT

A telephone answering machine and method of use utilizes speech recognition to identify a caller from a pre-defined list of possible callers. The list may be generated by various input techniques, including a spoken voice at the called party's location, and keyboard or graphical input techniques. If the caller is identified as being on the list, the machine allows the call to progress along a first sequence, which includes ringing the called phone. If the called phone does not answer, the first sequence may provide for responding with a customized message for the calling party. If the caller is not identified as being on the list, the machine allows the call to progress along a second sequence, which includes responding with a standard recorded message. In either case, the caller is typically allowed to record a message for the called party. Additional pre-defined lists may be provided, as for determining the context of a call.

16 Claims, 2 Drawing Sheets

DIGITAL SECRETARY

BACKGROUND OF THE INVENTION

1. Description of the Prior Art

Telephone answering machines typically allow for the playback of a recorded message from the called party, and the recording of messages from the caller. A number of options may be provided in the form of touch-tone button sequences that allow the caller to reach a particular called party out of a list of possible parties. In addition, various voice menus may be provided to guide the caller through the possible options. For example, the AUDIX® system of AT&T Corp. allows such options. The recorded responses may be customized depending on the party or option chosen by the caller. However, if a called party wishes to screen incoming calls before answering, the possibilities are at present limited. For example, it is known to utilize a private code that is entered by the calling party on a touch-tone pad before allowing access to the called party. However, this requires prior arrangements between the called and calling parties that may not be convenient in many cases, and is susceptible to lost or misplaced codes and various other problems. It is also known to use the incoming phone number, or alternatively voice recognition, to verify a caller's identity. These techniques are typically implemented in digital systems by various combinations of hardware and software. However, voice recognition may require training the voice recognition system a large number of times in order to obtain adequate accuracy.

Speech recognition has been used in cellular phones, wherein a given phone number is dialed when a given phrase is spoken, in order to provide hands-free dialing. Speech recognition and speech synthesis are also being used in personal computer (PC) applications. For example, trainable speech recognition has been utilized to implement control of various computer operations, such as copying a file or launching an application, etc. Text-to-speech synthesis has also been used for various applications, wherein the PC operator types or otherwise inputs the text. Typical applications include reading long documents or speaking simple requests for inputs of required data, etc. However, present day speech recognition techniques may be limited to a relatively small number of speaker-independent words that can be recognized with adequate accuracy, especially if the techniques are implemented in low-cost systems. Also, the time required for the system to identify a given word may be inordinately long for the rapid response required in many conversational situations, again especially if implemented in low-cost systems.

2. Summary of the Invention

I have invented a telephone answering machine and method of use that utilizes speech recognition in order to determine whether the caller is on a pre-defined list of callers to be accepted. The list may be generated by various input techniques, including a spoken voice at the called party's location, or keyboard or graphical input techniques. If the caller is determined as being on the list, the machine allows the call to progress along a first sequence, which typically includes ringing the called phone. If the called phone does not answer, the first sequence may provide for responding with a customized message for the calling party. If the caller is not identified as being on the list, the machine allows the call to progress along a second sequence, which typically includes responding with a standard recorded message. In either case, the caller is typically allowed to record a message for the called party. Other lists may optionally be provided, as for determining the context of a call, for example.

DETAILED DESCRIPTION

The following detailed description relates to a telephone answering machine and method for its use. The inventive technique allows for a digital answering machine to screen calls based on caller identification. It also allows the called party to leave customized messages that are played based upon identification of the calling party. A typical sequence of operations is as follows, wherein steps 1 and 2 may be performed off-line prior to on-line system activation if desired:

1. The person in control of the the answering machine (the "called party") generates an "accept call" list that includes a specified person or persons, and indicates that the called party be provided an indication of an incoming call only when a specified person calls. The accept call list may be generated by the called party speaking into the answering machine's microphone, or alternatively by typing or graphical selection methods.

2. The called party may further specify that a specific ("customized") message is to be played when a person specified on the accept call list calls.

3. An incoming call is received. The machine answers, asking for the calling party to identify.

4. The calling party speaks his/her name.

5. The machine analyzes the name spoken by the calling party and determines whether the spoken name is on the accept call list.

6. If the calling party is not on the accept call list, the machine requests the calling party to leave a message.

7. If the calling party is on the accept call list, the machine provides an indication of the incoming call to the called party (e.g., rings the phone).

8. If the called party does not answer the phone in step 7, then the machine plays a recorded message, which may include a customized message provided for that caller in step 2. The machine further requests the calling party to leave a message.

While the above sequence is representative, still other options may be included, or various portions omitted, as will be apparent in the following discussion. Note that the analysis of the calling party's identity (step 5) does not require very high speed hardware/software as compared to various prior-art speech recognition applications, since only a few spoken words (typically a one or two word name) has to be compared against a relatively small list of words (the accept call list). In most cases, the accept call list needs to be only 100 names or less, and often 12 names or less, which can be readily accommodated with low-cost hardware and software. In addition, the time allowed for the analysis and determination in step 5 may be extended by several seconds by the simple expedient of programming the answering machine to state "please hold", or some other short message, while the analysis is being conducted. This is similar to the response expected when a human operator answers the phone, and further allows the hardware/software combination that implements the analysis to be relatively low cost.

Figure 1:
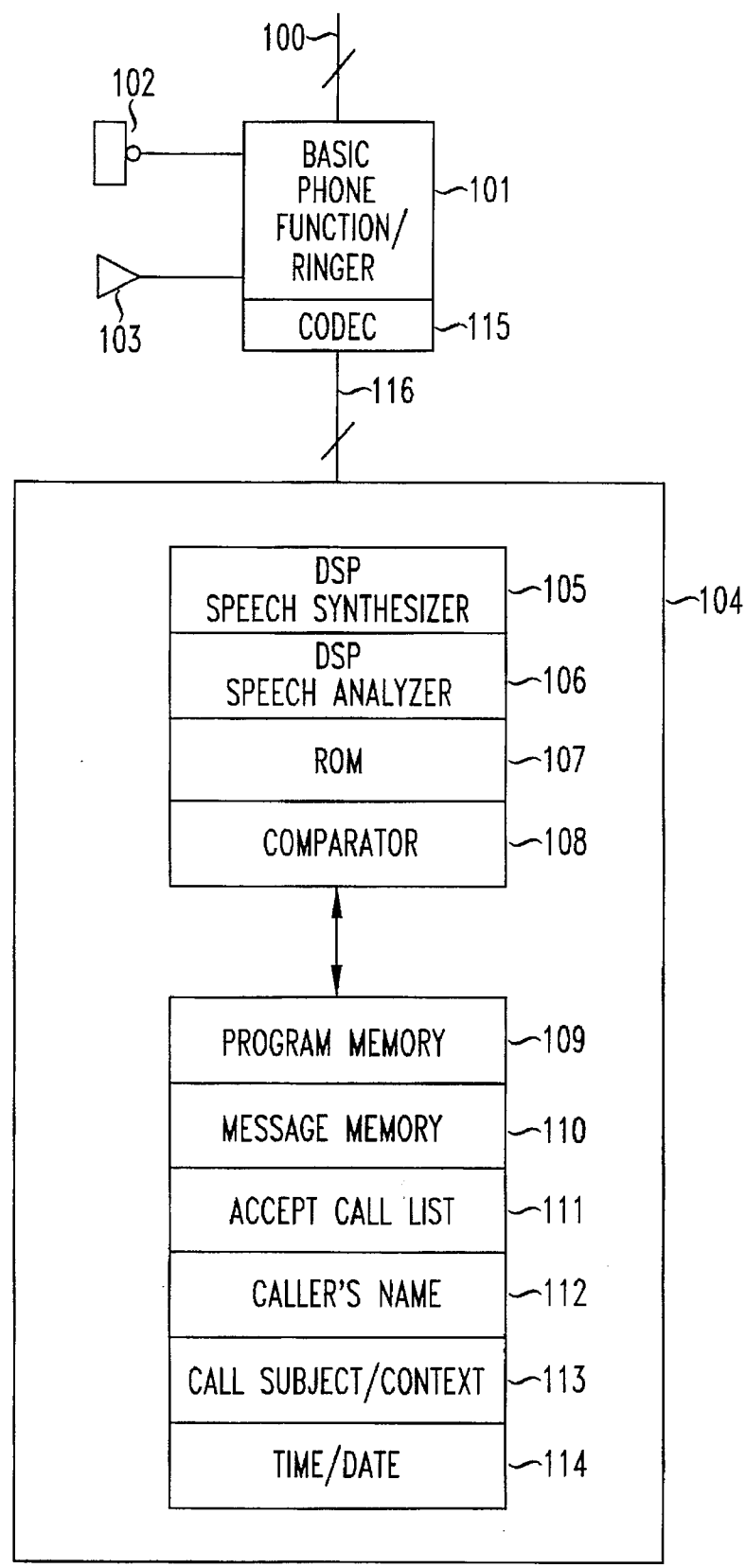
FIG. 1 illustrates a typical system implementation of the inventive technique.

A typical system implementation of the present technique is shown in FIG. 1, wherein a phone line 100 connects to a phone unit 101 having an attached microphone 102 and speaker 103. The phone unit implements basic phone functionality, including dialing and transmission/receipt of audio and ringing signals to/from the phone line, as well as any necessary 2 wire to 4 wire hybrid transformations. The phone unit 101 may include a CODEC 115 which converts the analog speech to digital pulse code modulation (PCM) format and vice-versa. The phone unit 101 connects to the answering machine 104, which includes a speech analyzer 106 and speech synthesizer 105. The terms "speech analyzer" and "speech generator" as used herein refer to the combination of hardware and software necessary to implement a given function. In most cases, the hardware is shared between the speech recognition and speech generation functions, with only a change in software required to implement a given function. The speech analyzer and speech synthesizer are advantageously implemented using digital signal processor (DSP) technology. Various hardware/software combinations are known in the art for performing these functions, and any technique yielding suitable performance at a desired cost and complexity may be used in implementing the present invention.

The answering machine also includes a program memory 109 and message memory 110, which may be physically separate, or may be a shared memory space. The program memory is typically a read-only memory (ROM) 107, but may alternatively be an electrically erasable programmable read-only memory (EEPROM) to allow for version updates. The program memory may also include a random-access memory (RAM) 109 to boost speed. The message memory 110 may include a ROM, EEPROM, or RAM for storing outgoing messages, and may include a RAM or EEPROM for incoming messages. It may also include some or all of the "announcements" referred to herein, although some of them may be permanently stored in ROM if desired. The use of "audio RAMs" (ARAMs) is also known in the answering machine art, with ARAMs being RAMs that are allowed to have a small number of defective bits, in order to allow the use of lower-cost integrated circuit memory chips. The outgoing messages and announcements may be stored in any suitable digitized speech format, typically a compressed format to reduce memory space. The outgoing messages and announcements may alternatively be stored in ASCII format, for example, to allow for entering the desired information from a keyboard or other input device.

An "accept call list" is maintained in a memory 111, whereas the identity of the caller, stored as a digital representation of the caller's name as determined by the speech analyzer, is maintained in memory 112. A digital comparator 108 is used to compare the caller's identity as stored in memory 112 against the accept call list in memory 111. Various other functions described below may be implemented using additional hardware (not shown), or in many cases by additional software, most typically stored in the above-noted program memory and message memory. The DSP, program ROM and comparator (105, 106, 107, 108) may be formed on a first integrated circuit, and the other memory (109, 110, 111, 112, 113, 114) may be formed on a second integrated circuit if desired, with other partitions being possible.

Note that all of the functions of blocks 101 and 104 may be included in a single combination phone/answering machine if desired, and a microphone 102 and/or speaker 103 may also be included. Alternatively, the phone function may be implemented as a unit separate from the answering machine. The phone functionality may be included in a personal computer if desired, as in the case of a microphone and speakers included in the video monitor, for example. The answering machine functionality may then be conveniently implemented using the memory and logic available in the PC, either on the main circuit board or as a plug in unit. While a standard analog phone indicated above may be used, a digital phone comprising analog-to-digital and digital-to-analog converters may alternatively be used. For example, an ISDN (integrated services digital network) phone may be used, or alternatively a phone connected to a broadband network or Internet provider. The "ringing" and incoming call receipt functions may be modified from those provided by a conventional analog phone, if desired. For example, a visual indication of "ringing" may be provided, and the incoming call recognized as a particular digital bit sequence rather than an analog ringing voltage, as appropriate to the particular implementation.

Figure 2:
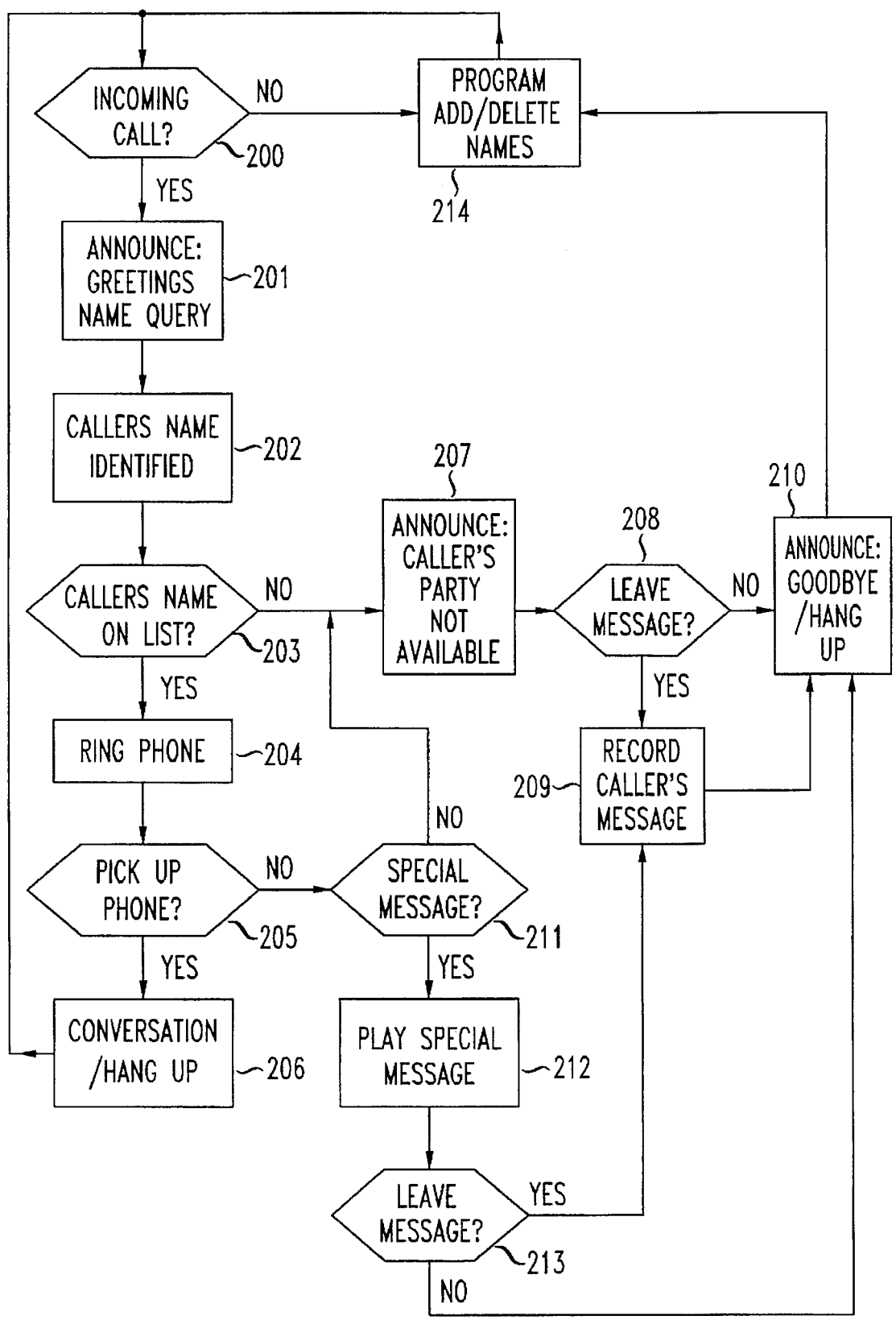
FIG. 2 illustrates typical sequences for implementing the invention.

A flow chart that illustrates a typical sequence of operations is shown in FIG. 2. An incoming call is received (200) and a greeting is sent to the calling party (201). The greeting may be time sensitive ("good morning" or "good afternoon") by providing a clock in the answering machine, and typically states the name of the called party ("Mr. Smith's phone"). After the greeting, a query of the calling party's name is sent ("Who is calling please?"). Upon receipt of the caller's name the speech recognition hardware/software then analyzes the name (202). The result of the analysis is compared to the names in the accept call list, and a flag set if a match is found. The caller's name in PCM format may if desired also be converted to another format (ASCII, etc.), as for alphanumeric display. Note that the audio analysis may be accomplished in real time as the name is spoken if the analysis hardware/software is fast enough. However, with typical analysis techniques used today, it is usually desirable to temporarily store an audio waveform of the name in digital format, so that the analysis may be performed on an extended time scale. The results of the analysis are then digitally compared (203) with the names on the accept call list, which are typically also represented in PCM format. If a match is found, then an indication is provided of the incoming call, typically by ringing the phone (204). Thereafter, if the phone is answered within a designated time or number of rings (205), then the conversation is allowed to proceed. At the end of the conversation, the called party hangs up (206), and the answering machine is reset to await another incoming call (200).

In step 203 above, if the caller's name is not on the accept call list, then a pre-recorded announcement may be provided ("Mr. Smith is not available") (207), and the option to leave a message may be provided (208). This option may be exercised in a variety of ways, as by speaking the message after a beep, for example. Alternatively, a touch-tone button may be pressed to signify "yes" or "no" to this request. If a message is left, an option to modify the recorded message may be provided to the caller if desired (209). After recording the message, or if no message is left, a pre-recorded announcement may be provided by the called party if desired ("Thank you. Goodbye"), and the phone hung up (210).

In step 205 above, if the called party does not pick up the phone, then a determination may be made whether a special message should be provided to the caller (211). This determination is based upon the identity of the caller, as determined in step 202 above. If no special message is to be provided, then the standard request to leave a message is provided (207, 208) and the sequence continues as above. If the special message is to be provided, it is played for the caller (212). The special message may be a single message left for all callers on the accept call list, but alternatively may be a customized message for an individual caller, since the identity of the caller has already been determined from step 202 above. A message may be customized for a group of callers if desired, as for notifying attendees at a meeting of a change in meeting time or location. If a special message is actually played for a given caller, this fact may be stored in a tag associated with the message. This allows the called party to determine whether the message was retrieved. The caller may then be requested to leave a message (213), in which case the sequence continues in step 209 if a message is to be recorded, and continues in step 210 if no message is to be left. Messages from callers on the accept call list may be tagged for convenient retrieval separately from the other messages, if desired. For example, a tag with the caller's name and call context may be added in block 209.

After the phone is hung up (210), the answering machine returns to the awaiting call state (200). Note that when the machine is not active in processing a call, it is available for programming any of the above functions or announcements. This is provided by off-line programming (214), which may be accomplished in a variety of ways. For example, when entering information into the accept calls list, the called party may simply speak the names to be entered on the list, in which case the speech recognition hardware/software noted above may be used to convert the names to the appropriate digital format. Note that this is possible since the speech recognition hardware/software is typically speaker-independent in the inventive technique. Another technique for entering the names is to type the names from a keyboard. A graphical interface may also be used, as for designating the desired names from a stored directory. In still another technique, a file containing the names may be imported into the list. Note also that names may be deleted from the list in similar fashions. In addition, any of the above-noted announcements and special messages may be changed while the machine is off-line, and any options changed. While the term "off-line" is used to indicate the appropriate time for performing the programming step 214 in simple systems, it will be recognized that the programming may be accomplished while a call is in progress (machine on-line) in appropriate systems.

It is apparent that various of the functions described above are optional insofar as the present invention is concerned, and that still other functions not described may be included as desired. For example, additional analysis of the caller's voice may be accomplished to determine authenticity before playing a special message, since such a message could contain sensitive or proprietary material. This authentication is facilitated in the inventive technique, since the time required for the ringing of the phone (step 204) may be used for an extended analysis of the caller's voice waveform that may have been previously stored in digital memory for this purpose. Another option takes advantage of the fact that the names of the calling parties identified as being on the accept call list may be retained in memory after the identification step. Then, the called party may query the machine, by voice or any other technique, as to whether a particular party has called ("Has John Smith called?"). This information may be readily provided by a synthesized voice or visual indication. If desired, still more information may be provided, such as time and date the party called (stored in memory 114) and whether that party left a message. If a message has been left, it may be played back by the called party. In this manner, messages from the calling party may be retrieved in any desired sequence, not necessarily in the sequence that the messages were received. The called party may also ask the machine to read out the names of all parties on the accept call list who have called since the machine was last activated.

In addition to the caller identification described above based upon the caller's name, speech recognition may be performed in order to determine what the subject or context of a given call is. That is, a query as to the nature of the call may be made by the answering machine, and if a given word is spoken by the caller, then a special action may be taken by the answering machine. For example, if the query asks for the nature of the call and the word "emergency" is spoken by the caller, then the call may be forwarded to a portable phone rather than recorded. In another example, if in response to the query the word "plumber" or "electrician" is spoken by the caller, then a special message giving directions to the called party's house or place of business may be provided. In addition, the answering machine may include appropriate hardware and software to allow the called party to selectively play back messages that contain one or more given context words. For example, all calls containing the words "staff meeting" may be played back by the called party. The query and the words to be recognized may be entered by the called party when programming the answering machine in a manner analogous to that described above, and the relevant data stored in memory 113 shown in FIG. 1. Hence, a "call context" list may comprise the words that identify the subject of the call. Both call context and accept call lists may be stored in a single memory if desired. Still other variations that advantageously use the inventive teaching are possible.

The invention claimed is:

1. A telephone answering machine characterized by:
    a speech generator for prompting a caller for an identifying name;
    a speech recognizer for converting the name received to a digital representation that may be compared to a stored list of names;
    a stored list of names that are to be accepted;
    a comparator for comparing the digital representation of the name received to the stored list of names;
    an indicator to provide an indication to a called party that a given name received is on the stored list of names;
    a speech generator for playing a message to said calling party after said indication is provided; and
    a recorder for recording a message from the calling party in response to said message.

2. The invention of claim 1 wherein said speech generator plays a special message to said caller when said indicator indicates that the name received is on the stored list of names, and plays a standard message when said indicator indicates that the name received is not on the stored list of names.

3. The invention of claim 1 wherein said answering machine comprises means for playing messages received from a given caller.

4. The invention of claim 2 wherein said answering machine further comprises means for customizing said special message for a given caller on said stored list of names.

5. The invention of claim 1 wherein said answering machine includes a stored list of context words, and a comparator for comparing the digital representation of words received from a caller to the stored list of context words in order to indicate to a called party that a given context word is on the stored list of context words, whereby the context of a call may be determined.

6. The invention of claim 1 wherein said answering machine comprises means for providing the names of all callers who have left a message.

7. The invention of claim 6 wherein said answering machine further comprises means for playing back the message of a selected caller.

8. The invention of claim 1 wherein said answering machine comprises means for determining whether a given caller has retrieved a message.

9. The invention of claim 1 wherein said answering machine comprises means for playing back messages having a given context word.

10. The invention of claim 1 wherein said answering machine is adapted to connect to a telephone set that provides a microphone and speaker.

11. The invention of claim 1 wherein said telephone answering machine includes a digital telephone that comprises a CODEC.

12. A telephone answering machine characterized by:

a speech generator for prompting for an identifying name of a caller;

a speech recognizer for converting the name received to a digital representation that may be compared to a stored list of names;

a stored list of names that are to be accepted;

a comparator for comparing the digital representation of the name received to the stored list of names;

a ringing device to indicate to a called party that a given name received is on the stored list of names; and a recorder for recording a message from the calling party.

13. The invention of claim 12 wherein said answering machine comprises a speech generator for playing a special message to said caller when said indicator indicates that the name received is on the stored list of names, and for playing a standard message when said indicator indicates that the name received is not on the stored list of names.

14. The invention of claim 12 wherein said answering machine includes a stored list of context words, a comparison for comparing the digital representation of words received from a caller to the stored list of context words; and an indicator to indicate to a called party that a given context word is on the stored list of context words, whereby the context of a call may be determined.

15. The invention of claim 12 wherein said answering machine comprises means for providing the names of all callers who have left a message.

16. The invention of claim 12 wherein said answering machine is adapted to connect to a telephone set that provides a microphone and speaker.

* * * * *